(12) United States Patent
Kotake et al.

(10) Patent No.: US 10,634,376 B2
(45) Date of Patent: Apr. 28, 2020

(54) SYSTEM AND METHOD FOR CONTROLLING AN HVAC SYSTEM

(71) Applicant: Mitsubishi Electric Corporation, Tokyo (JP)

(72) Inventors: Hiroaki Kotake, Cypress, CA (US); Matthew Smithson, Cypress, CA (US); Haruhiko Ishida, Cypress, CA (US)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 15/336,946

(22) Filed: Oct. 28, 2016

(65) Prior Publication Data
US 2018/0119974 A1    May 3, 2018

(51) Int. Cl.
| | |
|---|---|
| F24F 11/30 | (2018.01) |
| F24F 11/56 | (2018.01) |
| F24F 11/62 | (2018.01) |
| F24F 110/20 | (2018.01) |
| F24F 110/50 | (2018.01) |
| F24F 110/10 | (2018.01) |

(52) U.S. Cl.
CPC .............. *F24F 11/30* (2018.01); *F24F 11/56* (2018.01); *F24F 11/62* (2018.01); *F24F 2110/10* (2018.01); *F24F 2110/20* (2018.01); *F24F 2110/50* (2018.01)

(58) Field of Classification Search
CPC .. F24F 11/54; F24F 11/56; F24F 11/57; F24F 11/58; G05D 23/193; G05D 23/1932; G05D 23/1934
See application file for complete search history.

(56) References Cited

U.S. PATENT DOCUMENTS

| | | | | | |
|---|---|---|---|---|---|
| 7,571,865 | B2 * | 8/2009 | Nicodem | ............. | F24F 11/0012 165/209 |
| 8,695,888 | B2 * | 4/2014 | Kates | ................. | G05D 23/1934 236/49.3 |
| 8,930,030 | B2 * | 1/2015 | Bester | .................. | F24F 11/0001 700/278 |
| 9,175,869 | B2 * | 11/2015 | Castillo | .................... | F24F 11/30 |
| 9,253,260 | B1 * | 2/2016 | Bailey | .................... | H04L 67/125 |
| 2006/0086112 | A1 * | 4/2006 | Bloemer | ................. | F24F 3/153 62/176.6 |
| 2008/0179053 | A1 * | 7/2008 | Kates | ....................... | F24F 3/044 165/208 |
| 2010/0298988 | A1 * | 11/2010 | Stachler | ............. | H01R 13/6456 700/276 |
| 2012/0067560 | A1 * | 3/2012 | Bergman | ........... | G05D 23/1904 165/238 |
| 2012/0253521 | A1 * | 10/2012 | Storm | ................ | G05D 23/1905 700/276 |

(Continued)

*Primary Examiner* — Nelson J Nieves
(74) *Attorney, Agent, or Firm* — Posz Law Group, PLC

(57) ABSTRACT

A heating, ventilation, and air conditioning (HVAC) system, comprising: an indoor HVAC unit configured to operate a first HVAC zone in accordance with an HVAC control signal; at least one piece of environmental equipment configured to control at least one environmental parameter in accordance with at least one environmental control signal; and an HVAC adapter configured to receive operational parameters over a communication network at system setup, provide the at least one environmental control signal to the at least one piece of environmental equipment.

9 Claims, 9 Drawing Sheets

(56) References Cited

U.S. PATENT DOCUMENTS

| | | | | |
|---|---|---|---|---|
| 2013/0087628 A1* | 4/2013 | Nelson | G05D 23/1934 | 236/51 |
| 2013/0140016 A1* | 6/2013 | Storm | G05D 23/1934 | 165/205 |
| 2013/0245836 A1* | 9/2013 | Goodfellow | F24F 11/0001 | 700/276 |
| 2014/0217185 A1* | 8/2014 | Bicknell | F24F 11/30 | 236/1 C |
| 2015/0168002 A1* | 6/2015 | Plitkins | F24F 11/30 | 165/237 |
| 2015/0345812 A1* | 12/2015 | Murthy | G05B 15/02 | 700/276 |
| 2016/0209068 A1* | 7/2016 | Castillo | G05B 15/02 | |
| 2017/0130981 A1* | 5/2017 | Willette | F24F 3/16 | |
| 2017/0146256 A1* | 5/2017 | Alexander | F24F 13/1426 | |
| 2017/0356669 A1* | 12/2017 | Gonia | F24D 19/1084 | |
| 2018/0004178 A1* | 1/2018 | Haines | G05B 15/02 | |
| 2018/0031260 A1* | 2/2018 | Bernbom | G05D 23/1905 | |

* cited by examiner

SYSTEM AND METHOD FOR CONTROLLING AN HVAC SYSTEM

TECHNICAL FIELD

The present invention relates generally to a system and method for controlling a heating, ventilation, and air-conditioning (HVAC) system. More particularly, the present disclosure relates to a system and method for controlling both air-conditioning and non-air-conditioning elements of an HVAC system.

BACKGROUND

Many heating, ventilation, and air-conditioning (HVAC) systems include both air-conditioning units as well as one or more environmental devices other than the air-conditioning unit. For example, an HVAC system might include an indoor air-conditioning unit for cooling or heating an area within a building, a humidifier for humidifying the area, and an electric heater for providing auxiliary heat to the area when needed.

Conventionally, the air-conditioning unit and the other devices are controlled separately. For example, in the above HVAC system, there would be an air-conditioner controller for controlling the indoor air-conditioner and an auxiliary controller for controlling the humidifier and the electric heater. Anytime it is necessary to operate the HVAC system as a whole, a user must separately operate both the air-conditioning controller and the auxiliary controller. The two are entirely different systems requiring entirely different control mechanisms.

As a result of this, it is difficult for the user to operate the entire HVAC system efficiently and effectively.

It would be desirable, therefore, for there to be a single controller that controlled both core air-conditioning units as well as auxiliary environmental devices, such as humidifiers or electric heaters in an HVAC system.

SUMMARY

A heating, ventilation, and air conditioning (HVAC) system is provided, comprising: an indoor HVAC unit configured to operate a first HVAC zone in accordance with an HVAC control signal; at least one piece of environmental equipment configured to control at least one environmental parameter in accordance with at least one environmental control signal; and an HVAC adapter configured to receive operational parameters over a communication network at system setup, provide the at least one environmental control signal to the at least one piece of environmental equipment.

The HVAC adapter may be further configured to provide the HVAC control signal to at least one of: the indoor HVAC unit or an HVAC adapter associated with an additional HVAC zone, in accordance with the operational parameters, and The HVAC adapter may be configured to provide the at least one environmental control signal to the at least one piece of environmental equipment in accordance with the operational control signal.

The HVAC system may further comprise: at least one environmental sensor configured to generate an environmental sensor signal in accordance with an environmental condition, wherein the HVAC adapter is further configured to receive the environmental sensor signal, and provide the HVAC control signal to at least one of: the indoor HVAC unit, the HVAC adapter associated with an additional HVAC zone, and the at least one piece of environmental equipment, in accordance with the operational parameters and the environmental sensor signal.

The at least one environmental sensor may include at least one of a humidity sensor, a temperature sensor, or an air quality sensor.

The at least one piece of environmental equipment may include at least one of an electric heater, a humidifier, a dehumidifier, a ventilator, and an air purifier.

The communication network may be one of a Bluetooth network, an IEEE 802.11 network, an IEEE 802.3 network, and IEEE 802.15.4 network, a ZWave network, a 433 MHz RF network, or a fiber optics network.

The communication network may be capable of connecting to at least one of: a smart phone device, a personal area network, or a local area network.

A heating, ventilation, and air conditioning (HVAC) system is provided, comprising: an HVAC adapter configured to receive operational parameters over a communication network at system start, and generate an internal control signal in response to the operational parameters; and an equipment controller configured to receive the internal control signal from the HVAC adapter, and provide at least one environmental control signal to at least one piece of environmental equipment configured to control at least one environmental parameter.

The HVAC system may further comprise: the indoor HVAC unit; and the at least one piece of environmental equipment.

The equipment controller may be configured to provide the at least one environmental control signal to the at least one piece of environmental equipment in accordance with the operational control signal.

The HVAC system may further comprise: at least one environmental sensor configured to generate an environmental sensor signal in accordance with an environmental condition, wherein the HVAC adapter is further configured to receive the environmental sensor signal, and generate the internal control signal in response to the operational parameters and the environmental sensor signal, and wherein the equipment controller is further configured to provide the at least one environmental control signal to the at least one piece of environmental equipment in accordance with one or both of the internal control signal and the environmental sensor signal.

The at least one environmental sensor includes at least one of a humidity sensor, a temperature sensor, and an air quality sensor.

The at least one piece of environmental equipment may include at least one of an electric heater, a humidifier, a dehumidifier, a ventilator, and an air purifier.

The communication network may be one of a Bluetooth network, an IEEE 802.11 network, an IEEE 802.3 network, and IEEE 802.15.4 network, a ZWave network, a 433 MHz RF network, or a fiber optics network.

The communication network may be capable of connecting to a smart phone device, a personal area network, or a local area network.

A method of operating a heating, ventilation, and air conditioning (HVAC) system is provided, comprising: receiving operational parameters over a communication network at system start; determining whether the operational parameters are directed to a current HVAC zone selected from a plurality of HVAC zones; determining whether the operational parameters include instructions to operate an HVAC unit in the current HVAC zone; providing instructions to the HVAC unit in the current HVAC zone when the operational parameters require the operation of the HVAC unit; determining whether the operational parameters require operation of an associated environmental unit; and providing instructions to the associated environmental unit when the operational parameters require operation of the associated environmental unit.

The method may further comprise: determining whether the HVAC adapter is a master unit prior to determining whether the operational parameters require operation of the associated environmental unit.

The method may further comprise: receiving a sensor signal from an environmental sensor in one of the plurality of HVAC zones; determining whether the sensor signal includes information that requires operation of the associated environmental unit; and providing instructions to the associated environmental unit when the sensor signal includes information that requires operation of the associated environmental unit.

The at least one environmental sensor may include at least one of a humidity sensor, a temperature sensor, and an air quality sensor.

The at least one piece of environmental equipment may include at least one of an electric heater, a humidifier, a dehumidifier, a ventilator, and an air purifier.

The communication network may be one of a Bluetooth network, an IEEE 802.11 network, an IEEE 802.3 network, and IEEE 802.15.4 network, a ZWave network, a 433 MHz RF network, or a fiber optics network.

The communication network may be capable of connecting to a smart phone device, a personal area network, or a local area network.

The method may further comprise: receiving initial sensor signals from environmental sensors in the plurality of HVAC zones; operating the associated environmental unit; waiting a delay time; receiving subsequent sensor signals from the environmental sensors in the plurality of HVAC zone after waiting the delay time; determining the effects of the environmental unit on each of the plurality of HVAC zones; and associating the environmental unit with each of the plurality of HVAC zones by a degree to which a given zone is affected by the environmental unit.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention. These drawings are not necessarily drawn to scale.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Furthermore, elements having the same number represent the same element across the various figures, and throughout the disclosure. Their description is not always repeated for each embodiment, but may be inferred from previous descriptions. Elements that have the same number but have the addition of a letter designator indicate distinct embodiments of a more generic element.

The disclosed system and method can control an HVAC system (i.e., air conditioners) as well as third party equipment (e.g. a humidifier, a dehumidifier, an electric heater, etc.) without requiring two separate controllers. In addition, the disclosed system and method allows for an 'equipment locator learning function,' which determines the magnitude by which each piece of third party equipment affects the space conditioned by each air conditioner.

HVAC System

Figure 1:
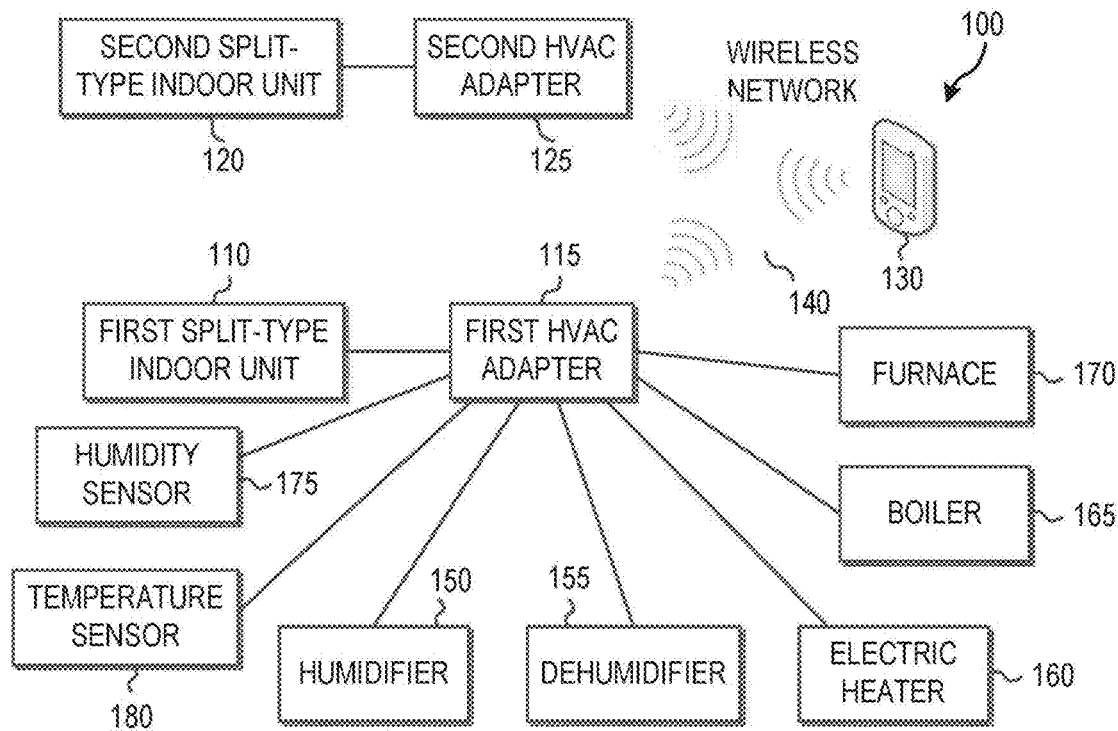
FIG. 1 is block diagram of an HVAC system, according to disclosed embodiments.

FIG. 1 is block diagram of a heating, ventilation, and air-conditioning (HVAC) system 100, according to disclosed embodiments. As shown in FIG. 1, the HVAC system 100 includes a first split-type indoor unit 110, a first HVAC adapter 115, a second split-type indoor unit 120, a second HVAC adapter 125, a smart phone 130, a wireless network 140, a humidifier 150, a dehumidifier 155, an electric heater 160, a boiler 165, a furnace 170, a humidity sensor 175, and a temperature sensor 180.

The first split-type indoor unit 110 (first HVAC unit) is a ductless air conditioning unit designed to heat or cool a first area, or first zone, within a building. Typically multiple split-type indoor units will be arranged within the building to heat and cool multiple zones within the building.

The first HVAC adapter 115 is a control unit configured to control the operation of the first split-type indoor unit 110, as well as the humidifier 150, the dehumidifier 155, the electric heater 160, the boiler 165, the furnace 170, the humidity sensor 175, and the temperature sensor 180.

The second split-type indoor unit 120 (second HVAC unit) is a ductless air conditioning unit designed to heat or cool a second area, or second zone, within a building.

The second HVAC adapter 125 is a control unit configured to control the operation of the second split-type indoor unit 120. Furthermore, if any piece of environmental equipment (environmental unit) or environmental sensors were connected to the second HVAC adapter 125, the second HVAC adapter 125 would be configured to control the operation of these elements.

The smart phone 130 is used to set up basic operation parameters for the first and second HVAC adapters 115, 125. In particular, the smart phone 130 can have an application on it that will allow a user to set the basic operation parameters for the HVAC system 100. These parameters can include a desired humidity, a desired temperature, whether the zones should be in heating or cooling modes, etc. The basic operation parameters can be set in general or on a zone-by-zone basis. Typically this is performed only one time when the system is first started, though it can be performed additional times, as desired.

A smart phone is not required for operational set up, however. Alternate embodiments can use other devices for controlling the set up of the first and second HVAC adapters 115, 125. Such other devices can be computer tablets, personal computers, multipurpose devices, or devices specifically designed for controlling the HVAC system 110.

The wireless network 140 is used to facilitate communication between the first HVAC adapter 115 and the smart phone 130, between the second HVAC adapter 125 and the smart phone 130, and between the first and second HVAC adapters 115, 125. In alternate embodiments with additional HVAC adapters, the wireless network 140 would preferably be configured to allow communication between all of the HVAC adapters. This wireless connection can be any suitable wireless connection, e.g., a Bluetooth network, an IEEE 802.11 network, an IEEE 802.3 network, an IEEE 802.15.4 network, a ZWave network, a 433 MHz RF network, etc.

Although a wireless network 140 is shown in this embodiment, in alternate embodiments the network can be a wired network, e.g., a fiber-optic network, an Ethernet network, etc.

The humidifier 150 operates to humidify at least one zone within the building based on commands from the first HVAC adapter 115. In some embodiments, the humidifier 150 will be limited to humidifying one or more zones within the building, while in other embodiments the humidifier 150 will humidify the entire building.

The dehumidifier 155 operates to dehumidify at least one zone within the building based on commands from the first HVAC adapter 115. In some embodiments, the dehumidifier 155 will be limited to dehumidifying one or more zones within the building, while in other embodiments the dehumidifier 155 will humidify the entire building.

The electric heater 160 operates to heat at least one zone within the building based on commands from the first HVAC adapter 115. In some embodiments, the electric heater 160 will be limited to heating one or more zones within the building, while in other embodiments the electric heater 160 will heat the entire building. In general, the electric heater 160 is provided for situations in which the first or second split-type indoor unit 110, 120 would not be sufficient to heat the desired zone(s) in the building.

The boiler 165 operates to heat at least one zone within the building based on commands from the first HVAC adapter 115. In some embodiments, the boiler 165 will be limited to heating a given zone within the building, while in other embodiments the boiler 165 will heat the entire building. In general, the boiler 165 is provided for situations in which the first or second split-type indoor unit 110, 120 would not be sufficient to heat the desired zone(s) in the building.

The furnace 170 operates to heat at least one zone within the building based on commands from the first HVAC adapter 115. In some embodiments, the furnace 170 will be limited to heating one or more zones within the building, while in other embodiments the furnace 170 will heat the entire building. In general, the furnace 170 is provided for situations in which the first or second split-type indoor unit 110, 120 would not be sufficient to heat the desired zone(s) in the building.

The humidifier 150, the dehumidifier 155, the electric heater 160, the boiler 165, and the furnace 170 can be considered pieces of environmental equipment, each used control at least one environmental parameter (e.g., heat or humidity). This list is not intended to be exhaustive, however. Other types of environmental equipment can be used in other embodiments to control the same or other environmental parameters. For example, the environmental equipment could include a ventilator, an air purifier, or any other desirable environmental equipment.

The humidity sensor 175 is connected to the first HVAC adapter 115 and operates to detect humidity in a zone in the building. It provides a humidity sensor signal that identifies the humidity in a given area.

The temperature sensor 180 is connected to the first HVAC adapter 115 and operates to detect temperature in a zone in the building. It provides a temperature sensor signal that identifies the temperature in the associated sound.

The humidity sensor 175 and the temperature sensor 180 can be considered environmental sensors that generate environmental sensor signals in accordance with environmental conditions (e.g., heat or humidity). This list is not intended to be exhaustive, however. Other types of environmental sensors can be used in other embodiments to identify the same or other environmental parameters. For example, the HVAC system 100 could include an air quality sensor.

The humidity sensor 175 and the temperature sensor 180, as well as any other environmental sensors used, can be sensors located outside an air-conditioned building and/or inside the air-conditioned building, depending upon the needs of the embodiment. Likewise, the various environmental sensors can be independent sensors, attached directly to HVAC units, sensors attached to directly to HVAC adapters, etc. They may have wired or wireless connections to the HVAC adapter 115.

In addition, alternate embodiments need not include all of the listed environmental equipment 150, 155, 160, 165, 170 and environmental sensors 175, 180. Subsets of this equipment are possible in various embodiments.

Although not shown, the second HVAC adapter 125 can have one or more pieces of environmental equipment attached to it and/or one or more environmental sensors attached to it, as with the first HVAC adapter 115.

Alternate embodiments of the disclosed HVAC system 100 could also include a clock, allowing the HVAC adapters 115, 125 to control its constituent parts based on the time of day. Similarly, the HVAC system 100 could include a calendar, allowing the HVAC adapters 115, 125 to control its constituent parts based on the day of the week or the month of the year.

Also, although two zones are disclosed in the above exemplary embodiment, other embodiments could employ more or fewer zones with an associated number of HVAC adapters to control them.

Arrangement by Zone

Figure 2:
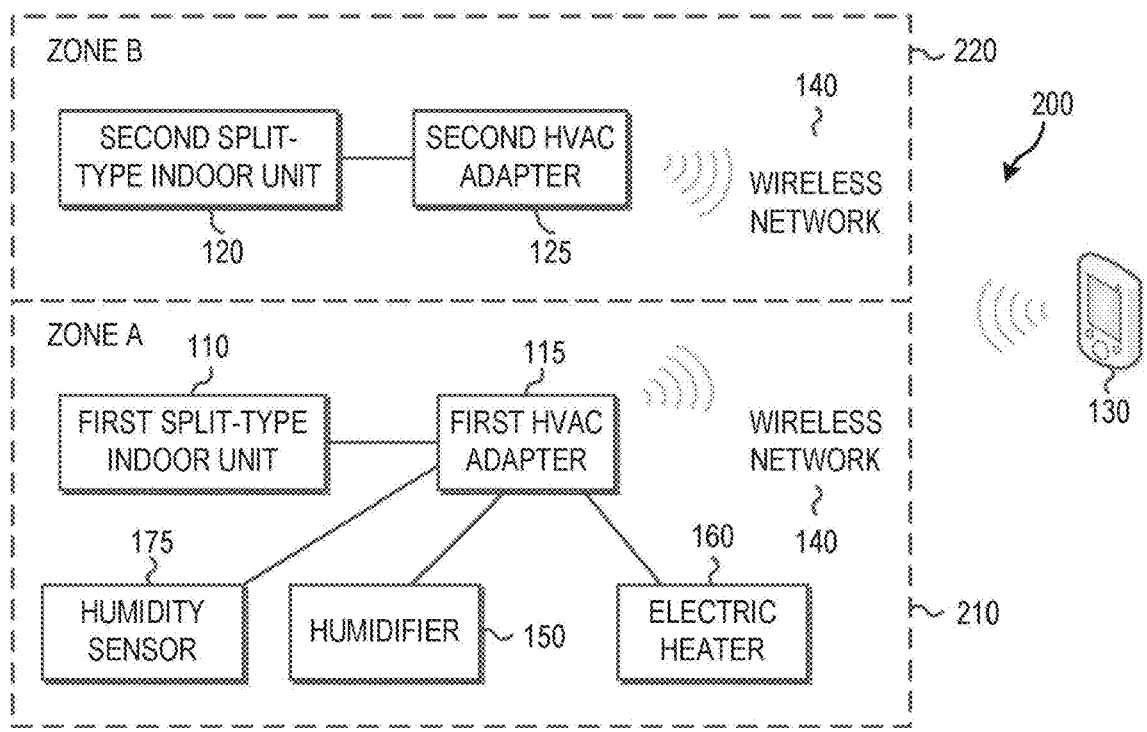
FIG. 2 is block diagram of an HVAC system divided by zone, according to disclosed embodiments.

FIG. 2 is block diagram of an HVAC system 200 divided by zone, according to disclosed embodiments. As shown in FIG. 2, the HVAC system 200 includes zone A 210, and zone B 220. Zone A 210 includes a first split-type indoor unit 110, a first HVAC adapter 115, a humidifier 150, an electric heater 160, and a humidity sensor 175. Zone B 220 includes a second split-type indoor unit 120 and a second HVAC adapter 125. The first and second HVAC adapters 115, 125 communicate with each other and with a smart phone 130 via a wireless network 140.

The first split-type indoor unit 110, the first HVAC adapter 115, the second split-type indoor unit 120, the second HVAC adapter 125, the smart phone 130, the wireless network 140, the humidifier 150, the electric heater 160, and the humidity sensor 175 are all described above with respect to FIG. 1. Their description will not be repeated here.

Zone A 210 is heated/cooled by the first split-type indoor unit 110, while zone B 220 is heated/cooled by the second split-type indoor unit 120. The humidifier 150 and the electric heater 160 are controlled by the first HVAC adapter 115, but may operate to humidify and heat in both zone A 210 and zone B 220.

As noted above, the wireless network 140 can be replaced with a wired network in alternate embodiments.

Furthermore, although zone A 210 is shown as having only a humidifier 150 and electric heater 160 as pieces of environmental equipment, alternate embodiments could have more or fewer pieces of environmental equipment. For example, the HVAC adapter 115 could be connected to any of the devices shown as being connected to the HVAC adapter 115 in FIG. 1.

Likewise, although zone A 210 is shown having only a humidity sensor 175 as an environmental sensor, alternate embodiments could have more or fewer environmental sensors. For example, the HVAC adapter 115 could be connected to a temperature sensor 180 as well as a humidity sensor 175.

In addition, as noted above with respect to FIG. 1, the HVAC adapter 115 could be connected to a clock or a calendar to allow the first HVAC adapter 115 to control operation of its associated equipment in accordance with a time of day, day of week, or month of year.

Also, although the first HVAC adapter 115 is shown as being connected to both an environmental sensor (the humidity sensor 175) and pieces of environmental equipment (the humidifier 150 and the electric heater 160), while the second HVAC adapter 125 is shown as being connected to no environmental sensors and no pieces of environmental equipment, this is by way of example only. In alternate embodiments, the second HVAC adapter 125 could also be connected to one or more environmental sensors and one or more pieces of environmental equipment (environmental units).

Furthermore, the first and second HVAC adapters 115, 125 can communicate with each other via the wireless network 140 (or in the alternative a wired network). In various embodiments these two HVAC adapters 115, 125 can work in tandem with each other, using sensor information or operational parameters from one HVAC adapter to control environmental equipment attached to the other HVAC adapter.

For example, if the first HVAC adapter 115 had a humidity sensor 175 connected to it, while the second HVAC adapter 125 had a humidifier 150 connected to it, the first HVAC adapter 115 could communicate with the second HVAC adapter 125 and control operation of the humidifier 150 based on a humidity signal received from the humidity sensor 175. This could be achieved by either passing along the humidity sensor information to the second HVAC adapter 125, or by sending a control signal to the second HVAC adapter 125 indicating that it should turn the humidifier on or off based as needed.

Finally, although FIG. 2 discloses only two zones (zone A 210 and zone B 220), this is by way of example only. Alternate embodiments can contain more or fewer zones as desired. In such alternate embodiments, the HVAC adapters should all be able to communicate with each other, whether directly or in a daisy-chained manner.

Heating Operation

Figure 3:
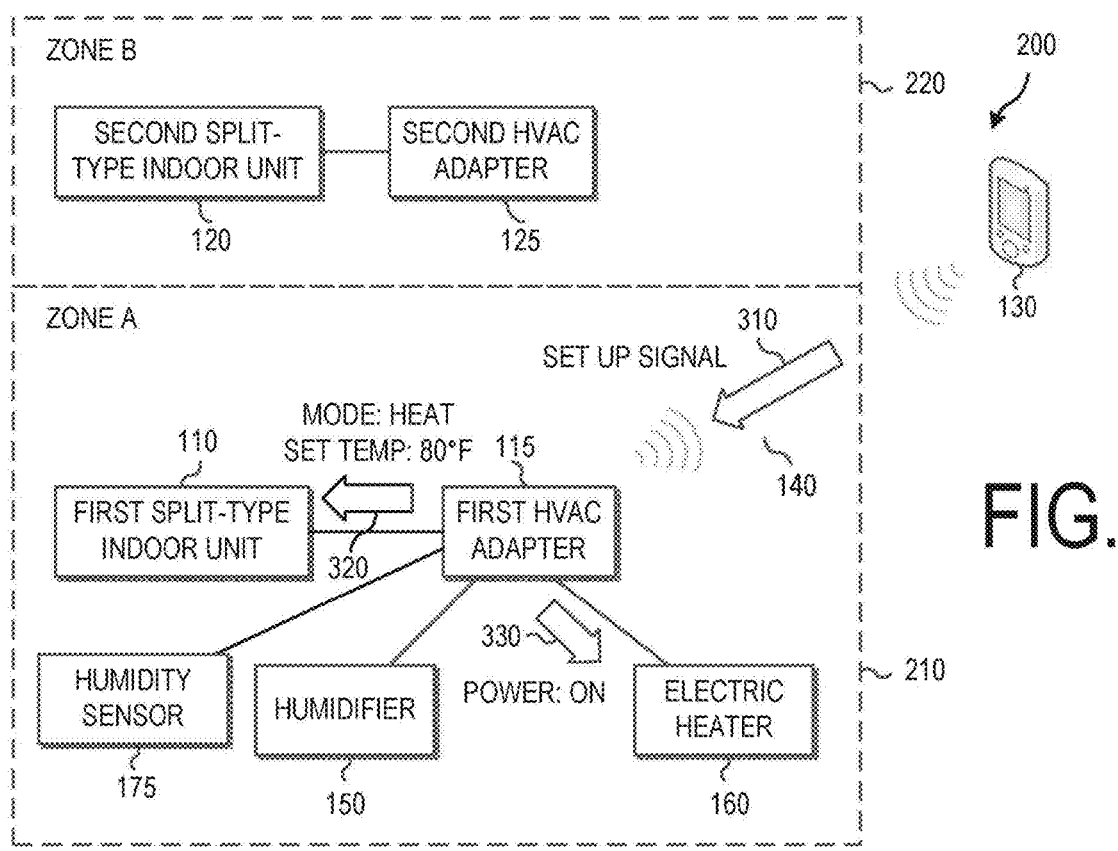
FIG. 3 is the HVAC system of FIG. 2 in which a heating operation is performed, according to disclosed embodiments.

FIG. 3 is the HVAC system of FIG. 2 in which a heating operation is performed, according to disclosed embodiments. The elements described in FIG. 2 operate as described above with respect to FIG. 2.

As shown in FIG. 3, a user transmits a set up signal 310 to the first HVAC adapter 115 over the wireless network 140. This set up signal 310 indicates that zone A 210 should be in a heat mode with a set temperature of 80° F.

In response to this set up signal 310, the first HVAC adapter 115 sends an HVAC control signal 320 to the first split-type indoor unit 110 instructing it to enter a heating mode with a set temperature of 80° F. In addition, the first HVAC adapter 115 sends environmental control signal 330 to the electric heater 160 instructing the electric heater 160 to turn on.

The reason that the electric heater 160 is turned on may be because the set up signal 310 indicated that the electric heater 160 should be turned on. In the alternative, the first HVAC adapter 115 may have a set of operational parameters loaded into it that indicates a threshold for the set temperature, above which the electric heater 160 is turned on in a heating mode. In this case, the set up signal 310 would merely have to indicate a heating mode with the set temperature of 80° F., and the first HVAC adapter could use the operational parameters to determine whether it was necessary to instruct the electric heater 160 to power on.

Cooling Operation

Figure 4:
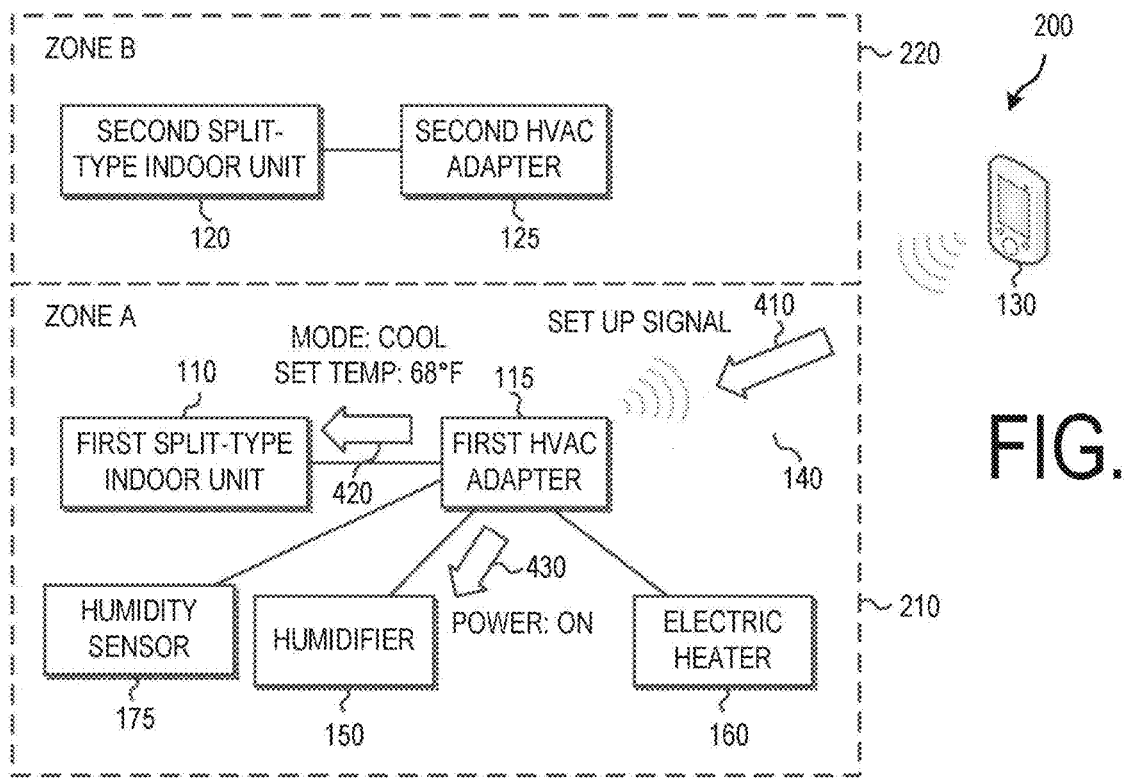
FIG. 4 is the HVAC system of FIG. 2 in which a cooling operation is performed, according to disclosed embodiments.

FIG. 4 is the HVAC system of FIG. 2 in which a cooling operation is performed, according to disclosed embodiments. The elements described in FIG. 2 operate as described above with respect to FIG. 2.

As shown in FIG. 4, a user transmits a set up signal 410 to the first HVAC adapter 115 over the wireless network 140. This set up signal 410 indicates that zone A 210 should be in a cool mode with a set temperature of 68° F.

In response to this set up signal 410, the first HVAC adapter 115 sends an HVAC control signal 420 to the first split-type indoor unit indicating that the first split-type indoor unit 110 should enter a cool mode with a set temperature of 68° F. In addition, the first HVAC adapter 115 sends environmental control signal 430 to the humidifier 150 instructing the humidifier 150 to turn on.

The reason that the humidifier 150 is turned on may be because the set up signal 410 indicated that the humidifier 150 should be turned on. In the alternative, the first HVAC adapter 115 may have a set of operational parameters loaded into it that indicates a threshold for the set temperature, below which the humidifier 150 is turned on in a cooling mode. In this case, the set up signal 410 would nearly have to indicate a cooling mode with the set temperature of 68° F., and the first HVAC adapter could use the operational parameters to determine whether it was necessary to instruct the humidifier 150 to power on.

Humidifying Operation

Figure 5:
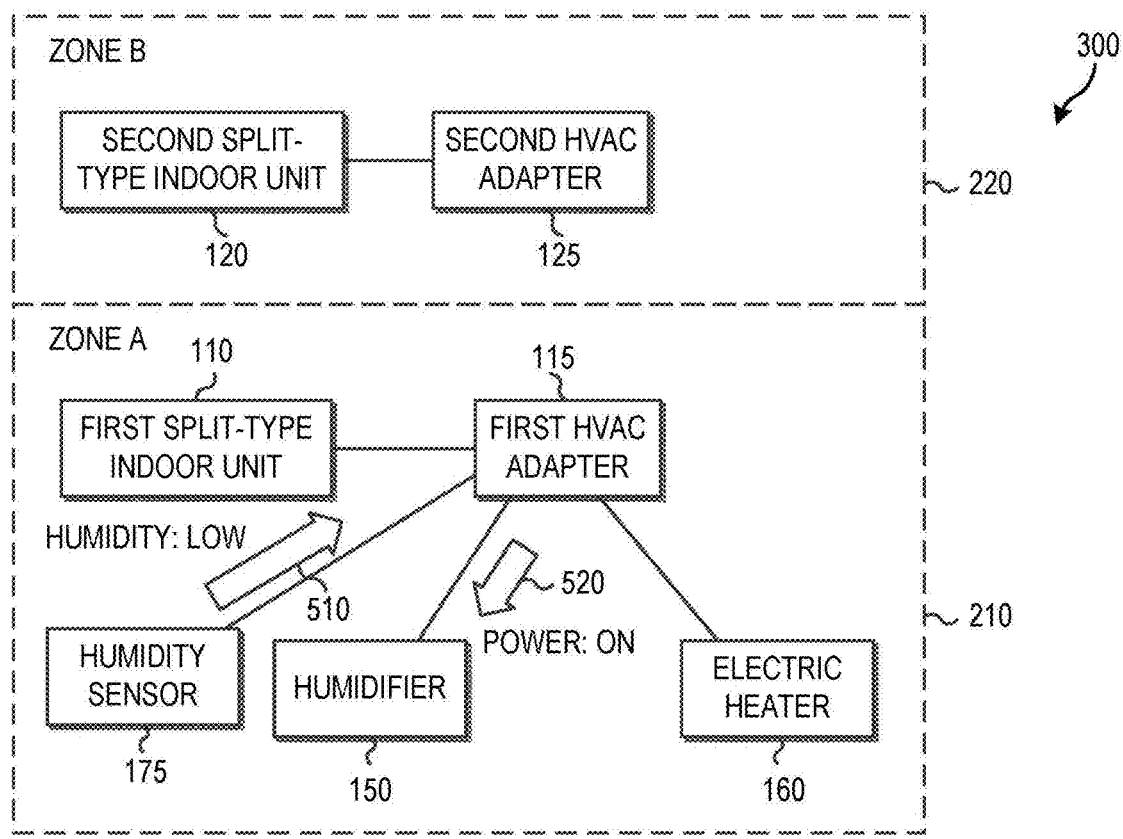
FIG. 5 is the HVAC system of FIG. 2 in which a humidifying operation is performed, according to disclosed embodiments.

FIG. 5 is the HVAC system of FIG. 2 in which a humidifying operation is performed, according to disclosed embodiments. The elements described in FIG. 2 operate as described above with respect to FIG. 2.

FIG. 5 shows a situation in which set up has already taken place and the HVAC adapter 115 is operating based on operation parameters loaded into the HVAC adapter 115. When the HVAC adapter 115 receives an environmental sensor signal 510 from the humidity sensor 175 indicating that humidity is low, the HVAC adapter 115 determines, based on the operational parameters, that it should send an environmental control signal 520 to the humidifier 150 indicating that the humidifier should be turned on.

In this way, the HVAC adapter 115 can have specific operation parameters loaded into it via a smart phone 130 or other device, and then automatically control operation of the devices 110, 150, 160 in its zone of control (zone A 210) without any further input from a user based on independent inputs (e.g., environmental sensor signals).

In alternate embodiments, the HVAC adapter 115 can receive inputs from other environmental sensors besides a humidity sensor 175. For example, it might receive inputs from a temperature sensor, and operate the first split-type indoor unit 110 and the humidifier 150 and electric heater 160 based on temperature signals received from the temperature sensor.

Likewise, in alternate embodiments the HVAC adapter 115 can receive inputs from other sources of information, such as a clock or a calendar. For example, it might receive a time-of-day input from a clock and control the operation of the first split-type indoor unit 110, the humidifier 150, and the electric heater 160 based on the time-of-day input.

Separate Equipment Controller

Figure 6:
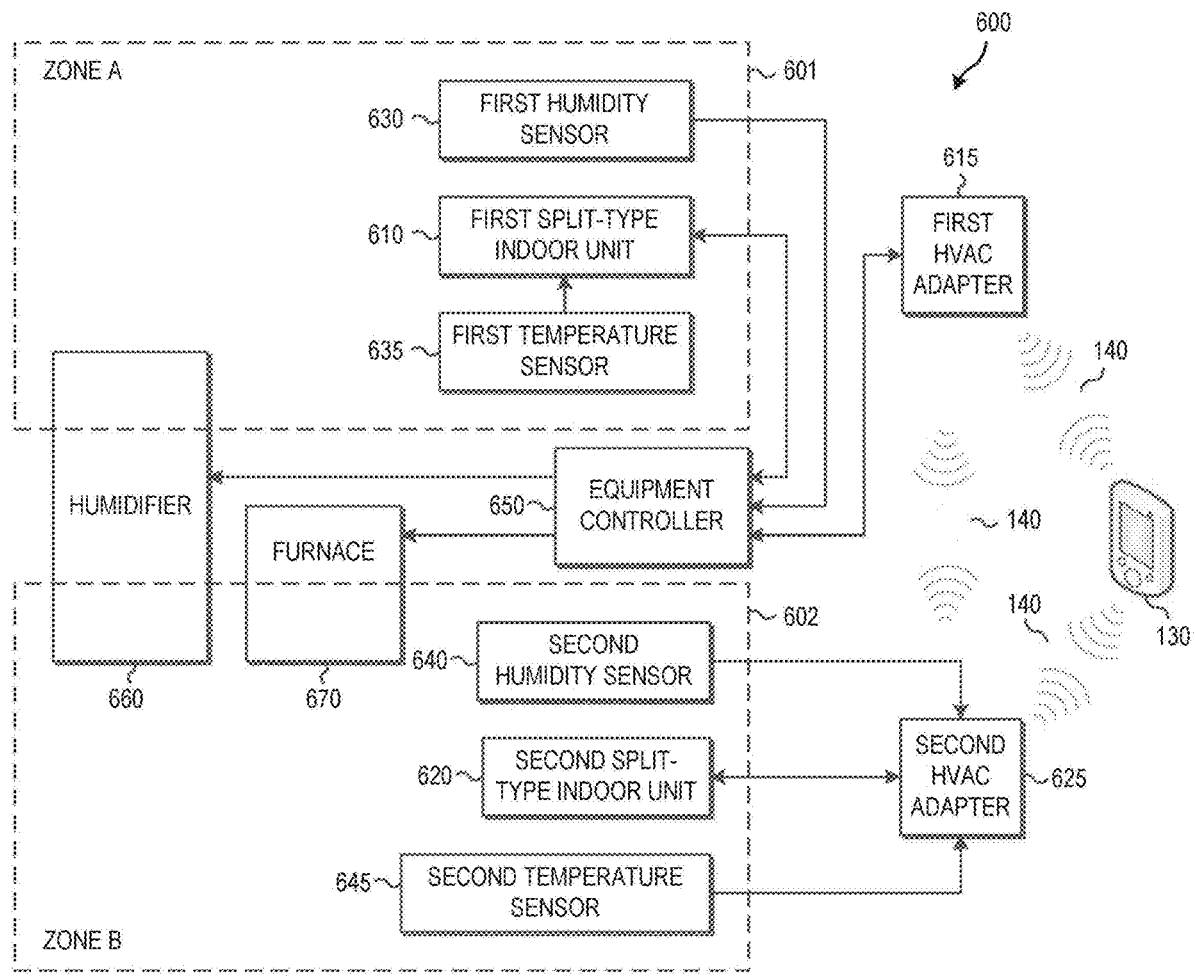
FIG. 6 is block diagram of an HVAC system divided by zone, according to alternate disclosed embodiments.

FIG. 6 is block diagram of an HVAC system 600 divided by zone, according to alternate disclosed embodiments. As shown in FIG. 6, the HVAC system 600 includes a first split-type indoor unit 610, a first HVAC adapter 615, a second split-type indoor unit 620, a second HVAC adapter 625, a smart phone 130, a wireless network 140, a first humidity sensor 630, a first temperature sensor 635, a second humidity sensor 640, a second temperature sensor 645, an equipment controller 650, a humidifier 660, and a furnace 670.

The area of the HVAC system 600 is divided into two zones: zone A 601 and zone B 602. Zone A 601 includes the first indoor split-type indoor unit 610, the first humidity sensor 630, and the first temperature sensor 635. Zone B 602 includes the second indoor split-type indoor unit 620, the second humidity sensor 640, and the second temperature sensor 645. The humidifier is connected to both zone A 601 and zone B 602; and the furnace is connected only to zone B 602.

The smart phone 130 and the wireless network 140 operate as described above with respect to FIGS. 1 and 2.

The first split-type indoor unit 610 is a ductless air conditioning unit designed to heat or cool zone A 601 within a building.

The first HVAC adapter 615 is a control unit configured to direct the operation of the first split-type indoor unit 610, as well as the humidifier 660 and the furnace 670.

The second split-type indoor unit 620 is a ductless air conditioning unit designed to heat or cool zone B 602 within a building.

The second HVAC adapter 625 is a control unit configured to direct the operation of the second split-type indoor unit 620

The first humidity sensor 630 is connected to the equipment controller 650 and operates to detect humidity in the zone A 601. It provides a first humidity sensor signal to the equipment controller 650 that identifies the humidity in zone A 601.

The first temperature sensor 635 is connected to the first split-type indoor unit 610 and operates to detect a temperature in the zone A 601. It provides a first temperature sensor signal to the first split-type indoor unit 610 that identifies the temperature in zone A 601.

The second humidity sensor 640 is connected to the second HVAC adapter 625 and operates to detect humidity in the zone B 602. It provides a second humidity sensor signal to the second HVAC adapter 625 that identifies the humidity in zone B 602.

The second temperature sensor 645 is connected to the second HVAC adapter 625 and operates to detect the temperature in the zone B 602. It provides a second temperature sensor signal to the second HVAC adapter 625 that identifies the temperature in zone B 602.

The equipment controller 650 is connected to the humidifier 660 and the furnace 670, and functions to control the operation of the humidifier 660 and the furnace 670. The equipment controller 650, either directly or indirectly, receives environmental sensor signals from the first humidity sensor 630, the first temperature sensor 635, the second humidity sensor 640, and the second temperature sensor 645. It also can potentially receive operational instructions, either directly or indirectly, from the first HVAC adapter 615 and the second HVAC adapter 625.

The humidifier 660 operates to humidify zone A 601 and zone B 602 in accordance with instructions from the equipment controller 650. In this embodiment, the humidifier is connected to both zone A 601 and zone B 602. However, in alternate embodiments the humidifier could only be connected to one or the other of zones A and B 601, 602.

The furnace 670 operates to heat zone B 602 in accordance with instructions from the equipment controller 650. In this embodiment, the humidifier is connected only to zone B 602. However, in alternate embodiments the humidifier could only be connected to only zone A 601, or to both of zones A and B 601, 602.

The humidifier 660 and the furnace 670 can be considered pieces of environmental equipment, each used control at least one environmental parameter (e.g., heat or humidity). This list is not intended to be exhaustive, however. Other types of environmental equipment can be used in other embodiments to control the same or other environmental parameters. For example, the environmental equipment could include a dehumidifier, an electric heater, a boiler, a ventilator, an air purifier, or any other desirable environmental equipment.

The humidity sensors 630, 640 and the temperature sensor 635, 645 can be considered environmental sensors that generate environmental sensor signals in accordance with environmental conditions (e.g., heat or humidity). This list is not intended to be exhaustive, however. Other types of environmental sensors can be used in other embodiments to identify the same or other environmental parameters. For example, the HVAC system 600 could include air quality sensors.

By having a separate equipment controller 650, this allows the first and second HVAC adapters 615, 625 to be simplified. The first and second HVAC adapter 615, 625 do not need to have interfaces for each of the pieces of environmental equipment 660, 670, but need only have a single interface that provides information to the equipment controller 650. Different equipment controllers 650 can then be designed for different embodiments having different arrangements of environmental equipment. This is advantageous because a HVAC system 600 generally includes multiple HVAC adapters, but only one equipment controller 650.

The HVAC system 600 of FIG. 6 shows two different ways by which a split-type indoor unit can be controlled. In zone A 601, the equipment controller 650 controls the first split-type indoor unit 610. The first HVAC adapter 615 contains operational set up information required to control the first split-type indoor unit 610. The first HVAC adapter 615 can share this information with the equipment controller 650, as necessary, to control the operation of the first split-type indoor unit 610.

In zone B 602, the second HVAC adapter 625 controls the second split-type indoor unit 610. To the extent that the second split-type indoor unit 620 needs to be controlled by information related to zone A 601, that information can be sent via the first HVAC adapter 615 and the wireless network 140.

The HVAC system 600 of FIG. 6 shows multiple ways by which environmental sensor signals can be passed from the variety of environmental sensors 630, 635, 640, 645 to the equipment controller 650. Alternate embodiments can mix and match these types of connections, or can provide alternate connections, such that they allow sensor data to be transmitted to the equipment controller 650.

The first humidity sensor 630 is connected directly to the equipment controller 650 and provides a first humidity sensor signal directly to the equipment controller 650.

The first temperature sensor 635 is connected to the first split-type indoor unit 610. It provides a first temperature sensor signal to the first split-type indoor unit 610, which then forwards the first temperature sensor signal to the equipment controller 650.

The second humidity sensor 640 is connected to the second HVAC adapter 625, and provides a second humidity sensor signal to the second HVAC adapter 625. Likewise, the second temperature sensor 645 is also connected to the second HVAC adapter 625 and provides a second temperature sensor signal to the second HVAC adapter 625. The second HVAC adapter 625 can forward these sensor signals to the first HVAC adapter 615 via the wireless network 140 (or an alternate wired network). The first HVAC adapter 615 can then forward the sensor signals from the second humidity sensor 640 and the second temperature sensor 645 to the equipment controller 650.

Similarly, operational set up information in the second HVAC adapter 625 can be forwarded to the equipment controller 615 via the wireless network 140 and the first HVAC adapter 615, if necessary for the control of the first split-type indoor unit, the humidifier 660, or the furnace 670. In alternate embodiments, the equipment controller could communicate wirelessly with the second HVAC adapter 625.

Although the HVAC system 600 of FIG. 6 discloses the use of humidity sensors 630, 640 and temperature sensors 635, 645, alternate embodiments could use more or fewer environmental sensors. Likewise, although the HVAC system 600 FIG. 6 discloses the use of the humidifier 660 and a furnace 670, alternate embodiments could use more or fewer pieces of environmental equipment. For example, the HVAC system 600 could include any of the pieces of environmental equipment noted in FIG. 1.

Furthermore, the HVAC system 600 could include a clock or a calendar to allow the equipment controller 650 and the HVAC adapter 615, 625 to use the time of day, day of week, or month of year to control the split-type indoor units 610, 620 and the environmental equipment 660, 670.

One benefit of the system of FIG. 6 is that all HVAC adapters need not necessarily contain the logic and hardware for interfacing with third party equipment (e.g., the humidifier 660 with a furnace 670). This will be advantageous because most HVAC adapters will only be connected to HVAC equipment, and won't be connected to third-party equipment. Breaking up the devices in this manner reduces overall cost.

Methods of Operation

Figure 7:
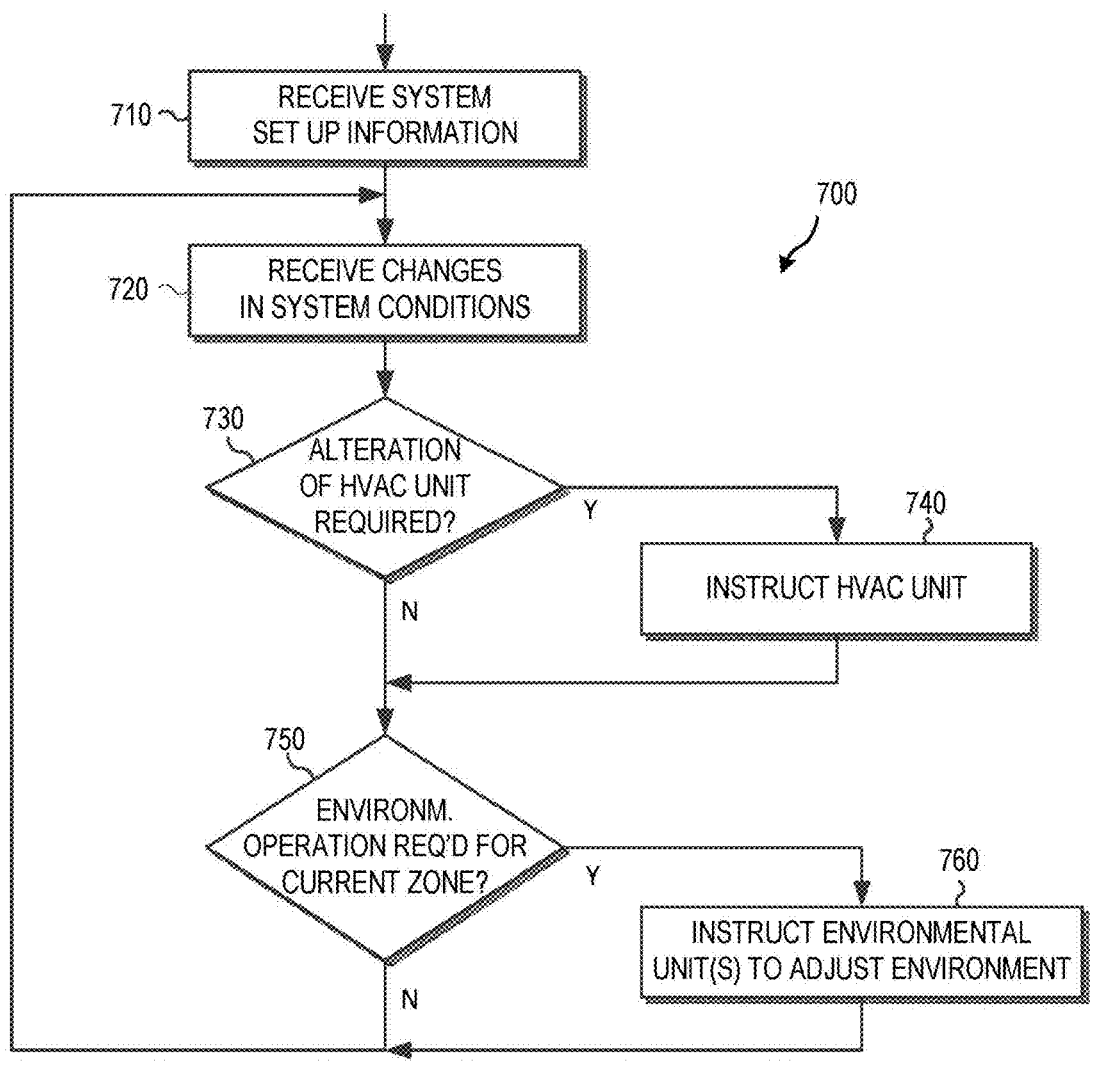
FIG. 7 is a flow chart showing the operation of an HVAC system in which an individual HVAC adapter controls environmental units, according to disclosed embodiments.

FIG. 7 is a flow chart showing the operation 700 of an HVAC system in which an individual HVAC adapter controls environmental units, according to disclosed embodiments.

As shown in FIG. 7, operation begins when the HVAC adapter receives system set up information. (710) This can include a desired temperature, or any other parameters as to when or how environmental units should be activated. In alternate embodiments, this operation can be omitted.

The HVAC adapter then receives changes in system conditions. (720) This can occur by having a smart phone or other controlling device provide specific instructions to the HVAC adapter; or it could be the results of environmental sensor information being provided to the HVAC adapter, either directly from the sensor or from a remote HVAC adapter associated with the environmental sensor. For example, the HVAC adapter could receive a change in system condition by having a user enter a new target temperature via a smart phone communicating with the HVAC adapter over a wireless network. In the alternative, the HVAC adapter could receive a change in system condition by having a temperature sensor indicate a change in temperature.

Some examples of triggers for changes in system conditions include: (1) a configuration change from a mobile application on a smart phone, e.g., that the mode has changed from heating to cooling; (2) a sensor value change, e.g., that the room temperature has risen to 70° F. or that the outdoor air temperature has dropped to 10° F.; (3) a timeout has occurred, e.g., the system has attempted to heat the room with an HVAC unit for 30 minutes without success, or that a ventilator has been on for 15 minutes and now it's time to turn it off; (4) an HVAC equipment status has changed, e.g., the device is going to defrost mode so it is necessary to turn on the furnace; or (5) a scheduled event has occurred, e.g., the desired room temperature has been set to 75° F. Many other triggers are possible.

The HVAC adapter then determines whether an alteration of the operation of an HVAC unit is required. (730) In other words, the HVAC adapter determines, based on the received changes in system conditions, whether it is necessary to turn on or turn off an HVAC unit attached to the HVAC adapter. For example, if the change in system conditions was a new temperature target received from a user for a heating mode, it may be necessary to activate the HVAC unit in a heating mode. Likewise, if the change in system conditions was a new temperature value from a temperature sensor, which rises above a temperature threshold while the HVAC adapter is in a cooling operation, it may be necessary to activate the HVAC unit in a cooling mode. Many other possible configurations are possible.

If the HVAC adapter determines that an alteration of the operation of an HVAC unit is required, then the HVAC adapter instructs the HVAC unit as appropriate to alter its operation. (740) This could involve turning the HVAC unit on in either a heating or a cooling mode, or turning the HVAC unit off.

The HVAC adapter then determines whether an environmental operation is required for the current zone that the HVAC adapter is associated with. (750) In other words, the HVAC adapter determines, based on the received changes in system conditions, whether it is necessary to activate or deactivate any environmental unit associated with the current zone. For example, if the change in system conditions was a new humidity target received from a user, it may be necessary to activate or deactivate a humidifier in the current zone. Likewise, if the change in system conditions was a new humidity value from a humidity sensor, which drops below a humidity threshold, it may be necessary to activate the humidifier in the current zone. Many other possible configurations are possible, depending upon the environmental units associated with the current zone.

If the HVAC adapter determines that an environmental operation is required for the current zone, then the HVAC adapter instructs the appropriate environmental unit or units as appropriate to alter their operation. (760) This could involve turning on or turning off individual environmental units, or adjusting the parameters of their operation.

Finally, after any environmental units are adjusted, the process returns to when the HVAC adapter receives the next change in system conditions. (720)

Figure 8:
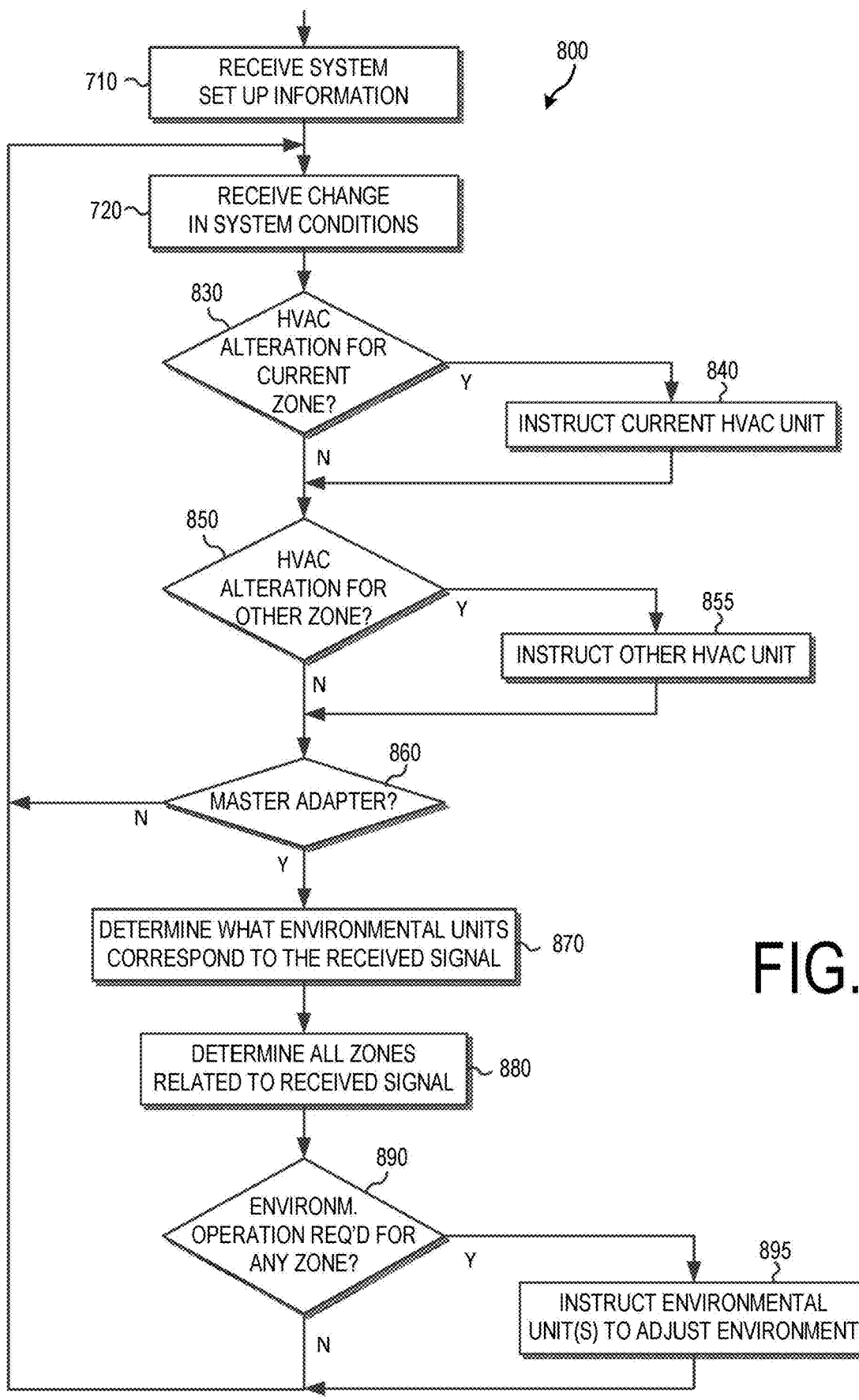
FIG. 8 is a flow chart showing the operation of an HVAC system in which a master HVAC adapter controls the operation of an HVAC system, according to disclosed embodiments.

FIG. 8 is a flow chart showing the operation 800 of an HVAC system in which a master HVAC adapter controls the operation of an HVAC system, according to disclosed embodiments.

As shown in FIG. 8, operation begins when the HVAC adapter receives system set up information. (710) This can include a desired temperature, or any other parameters as to when environmental units should be activated. In alternate embodiments, this operation can be omitted. A master HVAC adapter is an HVAC adapter that is configured to control environmental units as well as an HVAC unit.

The HVAC adapter then receives changes in system conditions. (720) This can occur by having a smart phone or other controlling device provide specific instructions to the HVAC adapter, or could be the result of environmental sensor information being provided to the HVAC adapter. For example, the HVAC adapter could receive a change in system condition by having a user enter a new target temperature via a smart phone communicating with the HVAC adapter over a wireless network. In the alternative, the HVAC adapter could receive a change in system condition by having a temperature sensor indicate a change in temperature.

The HVAC adapter then determines whether an alteration of the operation of the HVAC unit is required in the current zone associated with the HVAC adapter. (830) In other words, the HVAC adapter determines, based on the received changes in system conditions, whether it is necessary to turn on or turn off an HVAC unit attached to the HVAC adapter and in what mode the HVAC unit should be. For example, if the change in system conditions was a new temperature target received from a user, it may be necessary to activate the HVAC unit in a heating mode. Likewise, if the change in system conditions was a new temperature value from a temperature sensor, which rises above a temperature threshold while the HVAC adapter is coordinating a cooling operation, it may be necessary to activate the HVAC unit in a cooling mode. Many other possible configurations are possible.

If the HVAC adapter determines that an alteration of the operation of the HVAC unit in a zone associated with the HVAC adapter is required, then the HVAC adapter instructs the HVAC unit as appropriate to alter its operation. (840) This could involve turning the HVAC unit on in either a heating or a cooling mode, or turning the HVAC unit off.

The HVAC adapter then determines whether an alteration of the operation of an HVAC unit is required in any other zone. (850) In other words, the HVAC adapter determines, based on the received changes in system conditions, whether it is necessary to turn on or turn off any HVAC unit associated with a zone not associated with the HVAC adapter. For example, if the change in system conditions was a new temperature target received from a user for a different zone, it may be necessary to activate the HVAC unit in a heating mode in that zone. Likewise, if the change in system conditions was a new temperature value from a temperature sensor, which rises above a temperature threshold while the HVAC unit in the other zone is in a cooling operation, it may be necessary to activate the HVAC unit in a cooling mode in that sound. Many other possible configurations are possible.

If the HVAC adapter determines that an alteration of the operation of the HVAC unit in a zone not associated with the HVAC adapter is required, then the HVAC adapter instructs the HVAC unit as appropriate to alter its operation. (855) This could involve turning the HVAC unit on in either a heating or a cooling mode, or turning the HVAC unit off. In various embodiments the instructions could be provided directly to the HVAC units, or could be provided to the HVAC adapters associated with those HVAC units, allowing the other HVAC adapters to pass on the instructions to the HVAC unit.

The HVAC adapter then determines if it is the master adapter. (860) The master adapter is typically selected and configured at startup. If it is not the master adapter, processing returns to when the HVAC adapter next receives a change in system conditions. (720)

If, however the HVAC adapter determines that it is the master adapter, then it proceeds to determine what environmental units correspond to the received signal. (870) For example, if the received signal is either a new humidity target from a user or an environmental sensor signal from a humidity sensor, then the master HVAC adapter may determine that a humidifier or dehumidifier corresponds to the received signal. Likewise, if the received signal is either a new temperature target from a user or an environmental sensor signal from a temperature sensor, then the master HVAC adapter may determine that a furnace, electric heater, or boiler corresponds to the received signal.

The master HVAC adapter then determines all zones related to the received signal. (880)

Next, the master HVAC adapter determines whether an environmental operation is required for any zone based on the received signal. (890) In other words, the master HVAC adapter determines whether it is necessary to alter the operation of any of the environmental units, e.g., turning an environmental unit on, turning an environmental unit off, altering the operational parameters of an environmental unit, etc.

If the master HVAC adapter determines that an environmental operation is required for any zone, then the master HVAC adapter instructs the appropriate environmental unit or units as appropriate to alter their operation. (895) This could involve turning on or turning off individual environmental units, or adjusting the parameters of their operation.

Finally, after any environmental units are adjusted, the process returns to when the HVAC adapter receives the next change in system conditions. (720)

Figure 9:
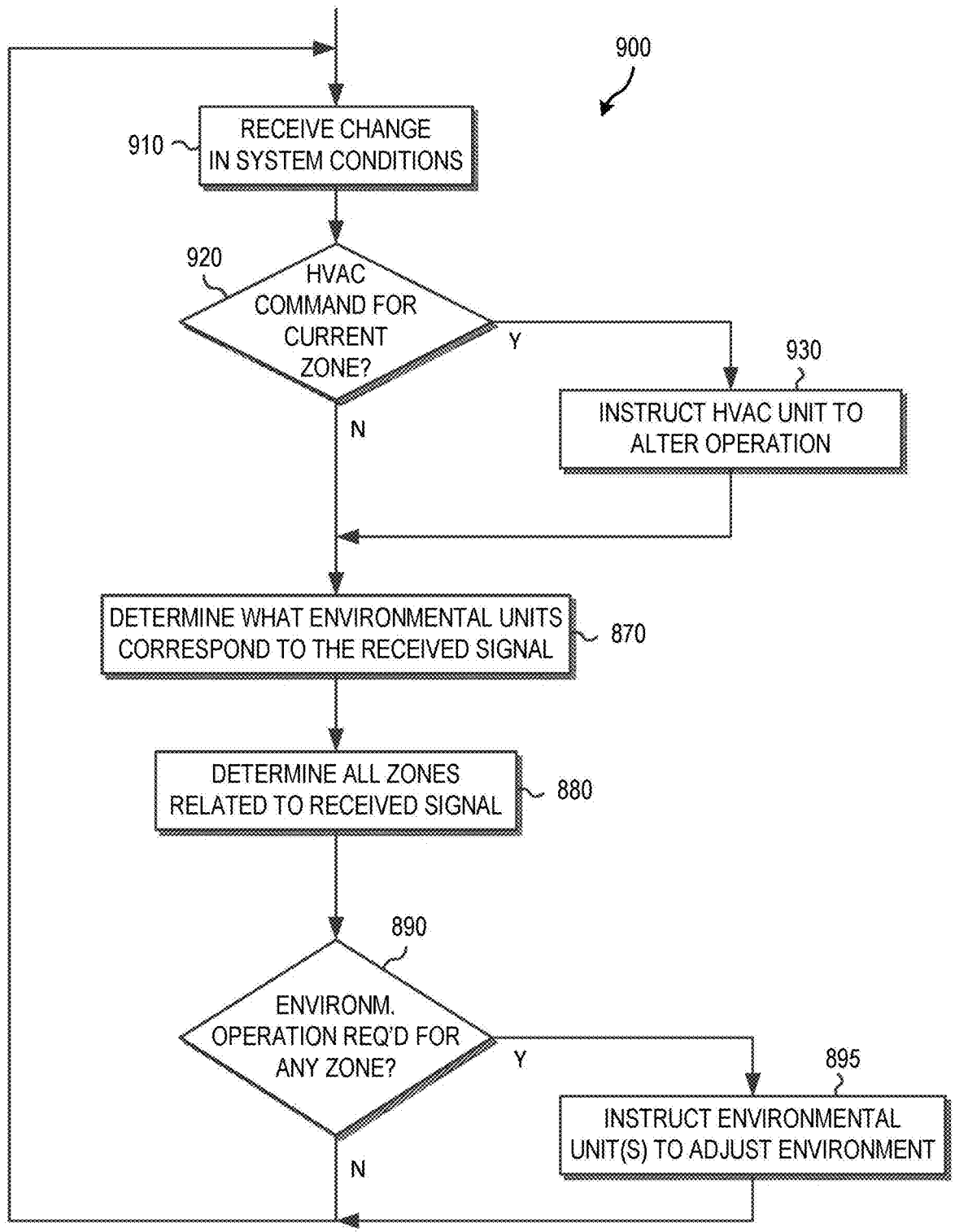
FIG. 9 is a flow chart showing the operation of an HVAC system in which an equipment controller controls environmental units, according to disclosed embodiments.

FIG. 9 is a flow chart showing the operation 900 of an HVAC system in which an equipment controller controls environmental units, according to disclosed embodiments.

As shown in FIG. 9, operation begins when the equipment controller receives a change in system conditions indicating that one or more associated HVAC units or environmental units should be controlled. (910) This can occur by having an HVAC adapter provide specific instructions to the equipment controller, or could be the results of environmental sensor information being provided to the equipment controller. For example, the equipment controller could receive a change in system condition by having a user enter a new target temperature via a smart phone communicating with an HVAC adapter over a wireless network. In the alternative, the equipment controller could receive a change in system condition by having a temperature sensor indicate a change in temperature.

The equipment controller then determines whether an alteration of the operation of an HVAC unit associated with the equipment controller. (920) In other words, the equipment controller determines, based on the received changes in system conditions, whether it is necessary to turn on or turn off an HVAC unit associated with the equipment controller. For example, if the change in system conditions was a new temperature target received from an HVAC adapter (based on a user request), it may be necessary to activate an HVAC unit in a heating mode. Likewise, if the change in system conditions was a new temperature value from a temperature sensor, which rises above a temperature threshold while the HVAC unit is in a cooling operation, it may be necessary to activate the HVAC unit in a cooling mode. Many other possible configurations are possible.

If the equipment controller determines that an alteration of the operation of the HVAC unit in a zone associated with the equipment controller is required, then the equipment controller instructs the HVAC unit as appropriate to alter its operation. (840) This could involve turning the HVAC unit on in either a heating or a cooling mode, or turning the HVAC unit off.

In some embodiments, the HVAC units will be controlled solely by the HVAC adapters. In such embodiments, operations 920 and 930 can be omitted.

Once any HVAC units are controlled, the equipment controller then determines what environmental units correspond to the received signal (870), determines all zones related to the received signals (880), determines whether environmental operations are required for any zone (890), and then instructs any environmental unit or units to adjust the environment, as necessary (895). These operations are the same as those described above with respect to FIG. 8, except that it is the equipment controller that performs these operations rather than a master HVAC adapter.

Figure 10:
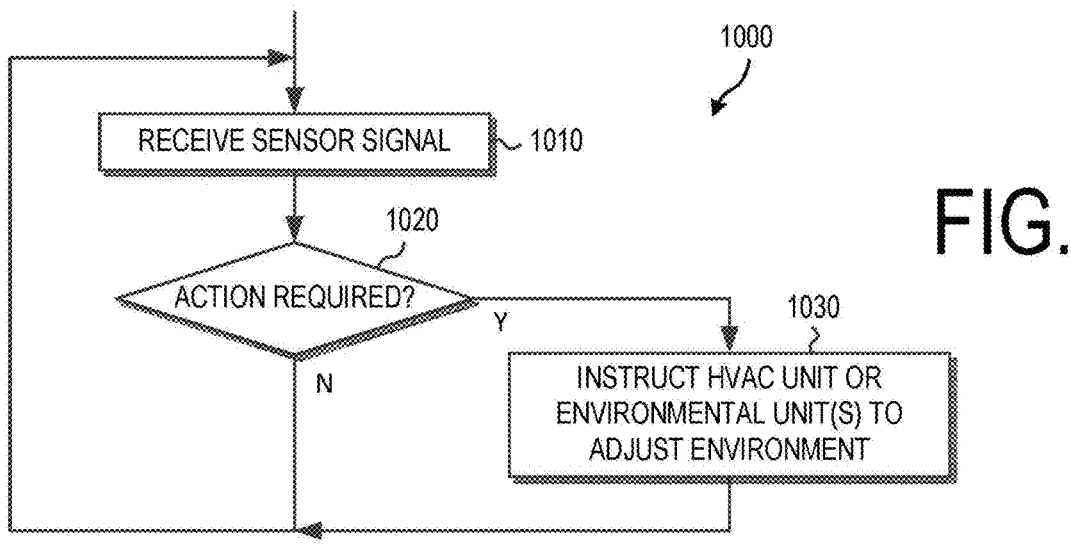
FIG. 10 is a flow chart showing the operation of an individual HVAC adapter in response to environmental sensor signals, according to disclosed embodiments.

FIG. 10 is a flow chart showing the operation 1000 of an individual HVAC adapter in response to environmental sensor signals, according to disclosed embodiments.

As shown in FIG. 10, operation begins when the HVAC adapter receives a sensor signal. (1010) This sensor signal is associated with an environmental sensor connected to the HVAC adapter. In various embodiments, this could be a humidity sensor signal, a temperature sensor signal, or any other appropriate sensor signal.

The HVAC adapter then determines whether any action is required based on the received sensor signal, along with any operational parameters associated with the HVAC adapter. (1020) For example, if a humidity sensor signal moves above or below a set threshold, depending upon the heating/cooling mode, it may be necessary to activate a humidifier or dehumidifier. Likewise, if the temperature sensor signal drops below a set threshold, it may be necessary to activate one or more of an HVAC unit, a furnace, a boiler, or an electric heater. Many other configurations are possible.

If action is required, the HVAC adapter then instructs an associated HVAC unit or an associated environmental unit or units to operate in accordance with the received sensor signal and any operational parameters associated with the HVAC adapter. (1030) This could involve turning HVAC units or environmental units on or off, or altering the operation of such HVAC units or environmental units.

Once any action is taken, or if no action is required, the HVAC adapter then returns to wait for the next received sensor signal. (1010)

Figure 11:
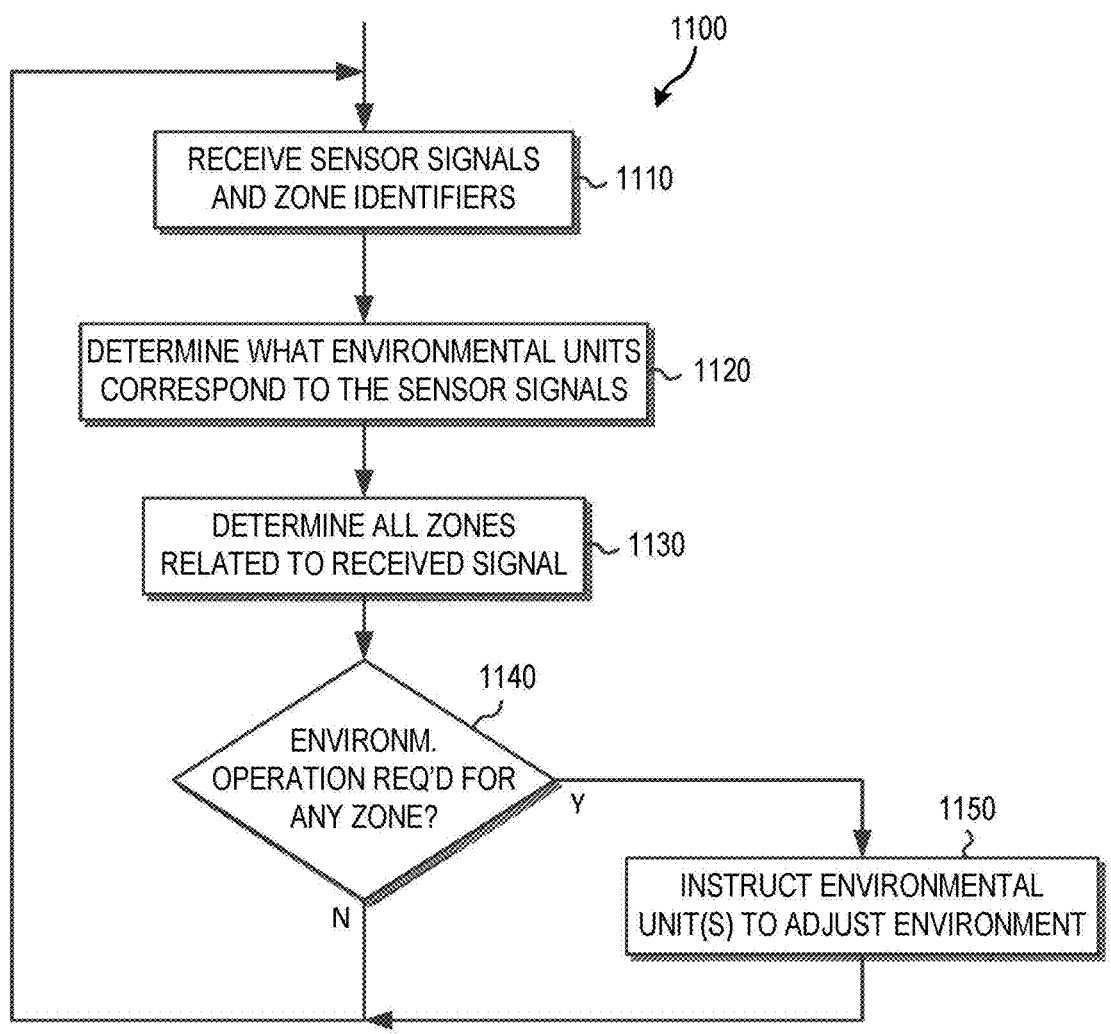
FIG. 11 is a flow chart showing the operation of a master HVAC adapter or an equipment controller in response to environmental sensor signals, according to disclosed embodiments.

FIG. 11 is a flow chart showing the operation 1100 of a master HVAC adapter or an equipment controller in response to environmental sensor signals, according to disclosed embodiments.

As shown in FIG. 11, operation begins when the master HVAC adapter/equipment controller receives a sensor signal. (1110) This sensor signal is associated with an environmental sensor connected to the master HVAC adapter/equipment controller. In various embodiments, this could be a humidity sensor signal, a temperature sensor signal, or any other appropriate sensor signal. These signals could be received directly from environmental sensors, or in a signal received from a remote HVAC adapter connected to the environmental sensors.

The master HVAC adapter/equipment controller then determines what environmental units correspond to the sensor signals. (1120) For example, a humidity sensor signal might be associated with a humidifier and a dehumidifier, while a temperature sensor signal might be associated with a furnace, boiler, and/or electric heater.

The master HVAC adapter/equipment controller then determines all zones related to the received signal. (1130) For example, the sensor signal might only be associated with a subset of possible zones within a building.

Then, based on the received sensor signals and operational information stored in the master HVAC adapter/equipment controller, the master HVAC adapter/equipment controller determines whether an environmental operation is required for any zone associated with the master HVAC adapter/equipment controller. (1140) For example, if the sensor signal indicates that the humidity has dropped in a given zone, and the operational information requires a certain minimum humidity for that zone, then the HVAC adapter/equipment controller could determine that it is necessary to operate a humidifier in that given zone. Many other configurations are possible.

Finally, the master HVAC adapter/equipment controller determines that environmental operations are required in any zone, then it instructs the associated environmental unit or units in those zones to adjust the environment accordingly. (1150) This could involve turning the environmental units on or off, or altering the parameters of operation of the environmental unit or units.

Learning Function

To control HVAC equipment effectively, HVAC adapters need to understand how each piece of equipment affects each zone. One of the ways to provide this information to the HVAC adapter is to require the user to register that information in smart phone/tablet application. Another method is to allow the adapters to automatically derive this information by comparing sensor values and equipment status.

The learning process is described by the following sequence: (1) HVAC adapters recognize all equipment physically connected to the adapter (i.e., initial setting); (2) for each piece of connected equipment, the HVAC adapter (a) reads initial sensor values, (b) operates the equipment in the target zone, and (c) reads subsequent sensor values; (3) HVAC adapters examine the sensor value changes; and (4) HVAC adapters determine how each piece of connected equipment affects each zone.

Figure 12:
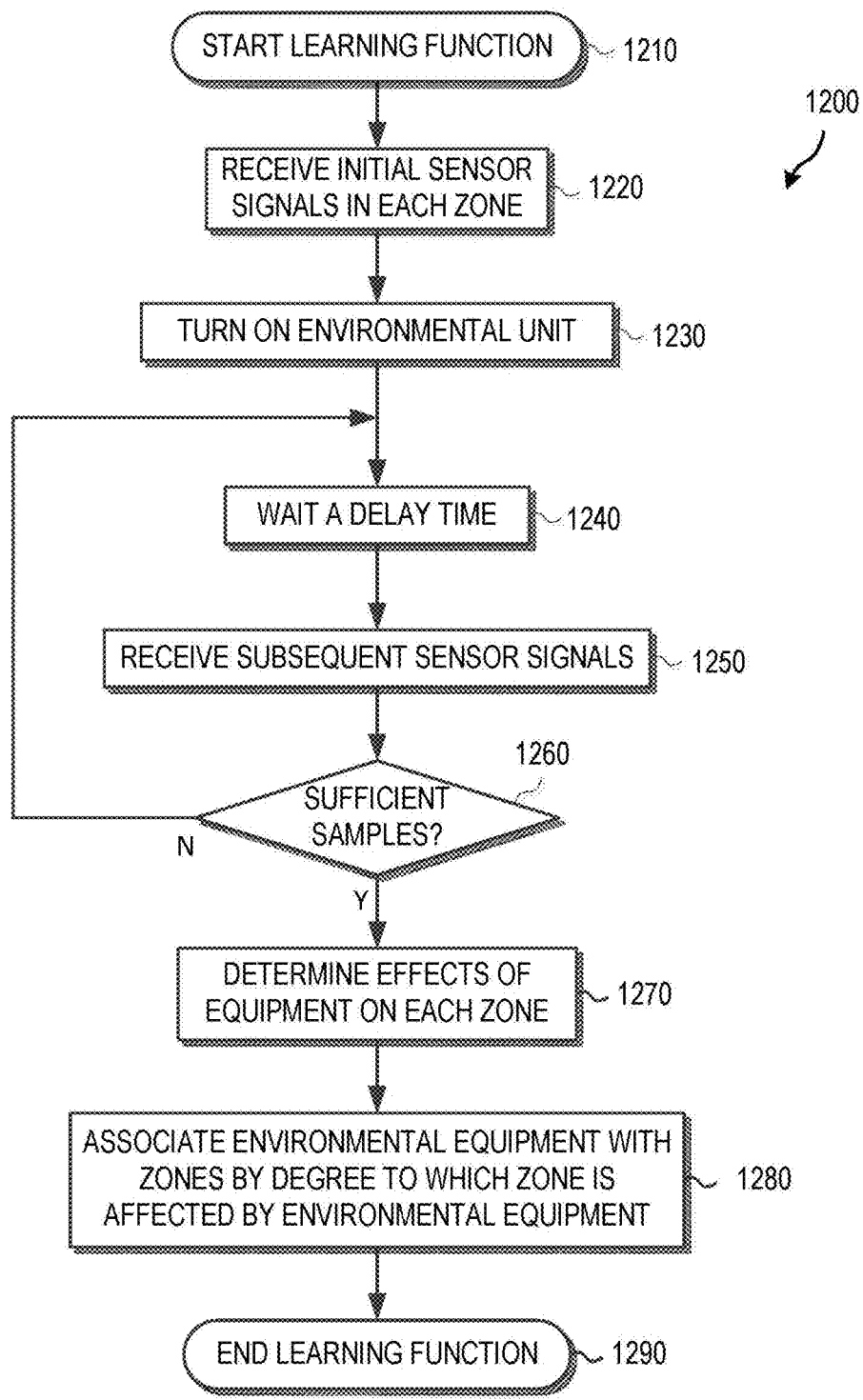
FIG. 12 is a flow chart showing the operation of a learning function in an HVAC adapter or an equipment controller, according to disclosed embodiments.

FIG. 12 is a flow chart showing the operation of a learning function 1200 in an HVAC adapter or an equipment controller, according to disclosed embodiments. In one disclosed embodiment, the learning function would reside only within the HVAC adapter. In other embodiments, it can reside within the equipment controller. In this operation, a master HVAC adapter/equipment controller can determine the effect of different pieces of environmental equipment in each zone of a multizone building.

As shown in FIG. 12, after starting the learning function (1210), the master HVAC adapter/equipment controller receives initial sensor signals in each zone for which an environmental sensor is associated (1220). For example, if there were three zones (A, B, C), with humidity sensors in zones A and C, the master HVAC adapter/equipment controller could receive an initialed humidity sensor signals from zones A and C.

After receiving the initial sensor signals, the master HVAC adapter/equipment controller then turns on an environmental unit. (1230) This could be any environmental unit associated with the master HVAC adapter/equipment controller, e.g., a humidifier, a dehumidifier, an electric heater, a furnace, a boiler, etc.

The master HVAC adapter/equipment controller then waits for a delay time (1240) and then receive subsequent sensor signals from the associated environmental sensors (1250).

The master HVAC adapter/equipment controller then determines whether sufficient samples have been obtained. (1260) if sufficient samples have not been obtained, it again waits for the delay time (1240), and receive a new sensor signal from the associated environmental sensors (1250).

Once sufficient samples have been obtained, the master HVAC adapter/equipment controller then determines the effect of the equipment in each zone, based on the set of received sensor signals. (1270) For example, if turning on a humidifier raises the humidity in zones A and B, but not in C, the master HVAC adapter/equipment controller will note this relationship.

The master HVAC adapter/equipment controller then associates the environmental units (environmental equipment) with the various zones in accordance with the degree to which each zone is affected by environmental equipment. (1280) For example, the master HVAC adapter/equipment controller might note that a humidifier has a strong effect on the humidity of zone A, a minor effect on the humidity of zone B, and no effect on the humidity in zone C. The exact associations made will depend upon the determination made in operation 1270. The user interface (e.g., on the smart phone) could then be updated to reflect these relationships.

Finally, the learning function ends. (1290)

It should be noted that this operation can be repeated for each environmental unit associated with the HVAC adapter/equipment controller.

For example, the learning function could be re-run, this time using the temperature sensors to determine the effect of the furnace upon each zone. For this example, a reasonable conclusion would be to determine that the furnace had no effect upon Zone A, and a strong effect upon Zone B. The user interface (e.g., on the smart phone) could then be updated to reflect these relationships.

It should be noted that the control of HVAC units or environmental units is independent of the zone to which those units or their controllers are connected. For example, it's possible to have an environmental unit physically connected to the HVAC adapter in zone B, even if the environmental unit doesn't necessarily affect the air in zone B. Such a connection may be simply for convenience, even though the environmental unit affects the air only in zone A.

Similarly the connection of sensors can be independent of the zones that they are sensing. For example, a humidity sensor might sense air in Zone A and be attached to an HVAC adapter in zone A even though it's driving a humidifier that is physically connected to the HVAC adapter in zone B.

Because the HVAC adapters are configured to contact each other through a wired or wireless network, the information from the various sensors and the control of the various HVAC units and environmental units can be controlled by zone, regardless of how they are actually connected. All that is necessary is to know which zone a sensor is associated with, and which zone an HVAC unit or environmental unit is associated with.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A heating, ventilation, and air conditioning (HVAC) system, comprising:
   a first indoor heater/air-conditioner configured to operate a first HVAC zone in accordance with a first HVAC control signal;

a second indoor heater/air-conditioner configured to operate a second HVAC zone in accordance with a second HVAC control signal;
at least one environmental regulator configured to control at least one environmental parameter in accordance with at least one environmental control signal;
a first HVAC adapter associated with the first HVAC zone and configured to control operation of the first indoor heater/air-conditioner; and
a second HVAC adapter associated with the second HVAC zone and configured to control operation of the second indoor heater/air-conditioner,
wherein
the first HVAC adapter is configured to
receive operational parameters over a communication network at system setup,
provide the at least one environmental control signal to the at least one environmental regulator,
generate the second HVAC control signal based on the operational parameters, and
directly provide the second HVAC control signal to the second HVAC adapter, and
the second HVAC adapter is configured to control operation of the second indoor heater/air-conditioner based on the second HVAC control signal.

2. The HVAC system of claim 1, wherein the first HVAC adapter is further configured to provide the first HVAC control signal to the first indoor heater/air-conditioner.

3. The HVAC system of claim 1, wherein
The first HVAC adapter is configured to provide the at least one environmental control signal to the at least one environmental regulator in accordance with the operational parameters.

4. The HVAC system of claim 1, further comprising:
at least one environmental sensor configured to generate an environmental sensor signal in accordance with an environmental condition,
wherein the first HVAC adapter is further configured to receive the environmental sensor signal, and
provide the first HVAC control signal to at least one of: the first indoor heater/air-conditioner and the at least one environmental regulator as the at least one environmental control signal, in accordance with the operational parameters and the environmental sensor signal.

5. The HVAC system of claim 4, wherein
the at least one environmental sensor includes at least one of a humidity sensor, a temperature sensor, or an air quality sensor.

6. The HVAC system of claim 1, further comprising:
at least one environmental sensor configured to generate an environmental sensor signal in accordance with an environmental condition in one of the first and second HVAC zones,
wherein
the first HVAC adapter is configured to generate the at least one environmental control signal based on the environmental sensor signal,
the at least one environmental regulator includes at least one of a humidifier, a dehumidifier, a ventilator, and an air purifier, and
the at least one environmental regulator is configured to control the at least one environmental parameter in both the first HVAC zone and the second HVAC zone based on the environmental control signal.

7. The HVAC system of claim 1, wherein
the communication network is one of a Bluetooth network, an IEEE 802.11 network, an IEEE 802.3 network, and IEEE 802.15.4 network, a ZWave network, a 433 MHz RF network, or a fiber optics network.

8. The HVAC system of claim 1, wherein
the communication network is capable of connecting to at least one of: a smart phone device, a personal area network, or a local area network.

9. A heating, ventilation, and air conditioning (HVAC) system, comprising:
a first indoor heater/air-conditioner configured to operate a first HVAC zone in accordance with a first HVAC control signal;
a second indoor heater/air-conditioner configured to operate a second HVAC zone in accordance with a second HVAC control signal;
at least one environmental regulator configured to control at least one environmental parameter in accordance with at least one environmental control signal;
a first HVAC adapter associated with the first HVAC zone and in a wired connection with first elements from the first indoor heater/air-conditioner; and
a second HVAC adapter associated with the second HVAC zone and in a wired connection with second elements from the second indoor heater/air-conditioner,
wherein
the first HVAC adapter is configured to
receive operational parameters over a communication network at system setup,
provide the at least one environmental control signal to the at least one environmental regulator,
generate the second HVAC control signal to control the second indoor heater/air-conditioner based on the operational parameters, and
wirelessly provide the second HVAC control signal to the second HVAC adapter,
the first HVAC adapter is not connected to the second elements from the second indoor heater/air-conditioner, and
the second HVAC adapter is not connected to the first elements from the first indoor heater/air-conditioner.

* * * * *